March 17, 1953 S. J. BEGUN 2,632,061

APPARATUS FOR PRODUCING VARIABLE WIDTH MAGNETIC RECORDINGS

Filed June 7, 1947 3 Sheets-Sheet 1

INVENTOR.
S. J. BEGUN
BY [signature]
ATTORNEY

March 17, 1953 S. J. BEGUN 2,632,061

APPARATUS FOR PRODUCING VARIABLE WIDTH MAGNETIC RECORDINGS

Filed June 7, 1947 3 Sheets-Sheet 2

INVENTOR.
S. J. BEGUN
BY [signature]
ATTORNEY

March 17, 1953 S. J. BEGUN 2,632,061

APPARATUS FOR PRODUCING VARIABLE WIDTH MAGNETIC RECORDINGS

Filed June 7, 1947 3 Sheets-Sheet 3

INVENTOR.
S. J. BEGUN

BY [signature]

ATTORNEY

Patented Mar. 17, 1953

2,632,061

UNITED STATES PATENT OFFICE 2,632,061

APPARATUS FOR PRODUCING VARIABLE WIDTH MAGNETIC RECORDINGS

Semi Joseph Begun, Cleveland Heights, Ohio, assignor to The Brush Development Company, Cleveland, Ohio, a corporation of Ohio Application June 7, 1947, Serial No. 753,328

4 Claims. (Cl. 179—100.2)

This invention relates to magnetic record transducing and more particularly to the recording, reproducing and obliterating of signals by varying the distribution of the magnetic characteristics along the width of a record member of extended area.

Among the objects of this invention are novel methods, apparatuses and record members for effecting magnetic transducing in such a manner that the recorded signal is represented as a magnetic characteristic varying along the transverse width of an elongated record track.

Another object of the invention is the inexpensive production of magnetic recordings in large quantities.

Other objects of the invention include record members and systems for transducing recordings on a record track extending along adjacent channels of an extended surface of a record member.

The foregoing and other objects of the invention will be best understood from the following description of exemplifications thereof, reference being had to the accompanying drawings, wherein.

Figures 1, 2, 2A, 2B, 3:
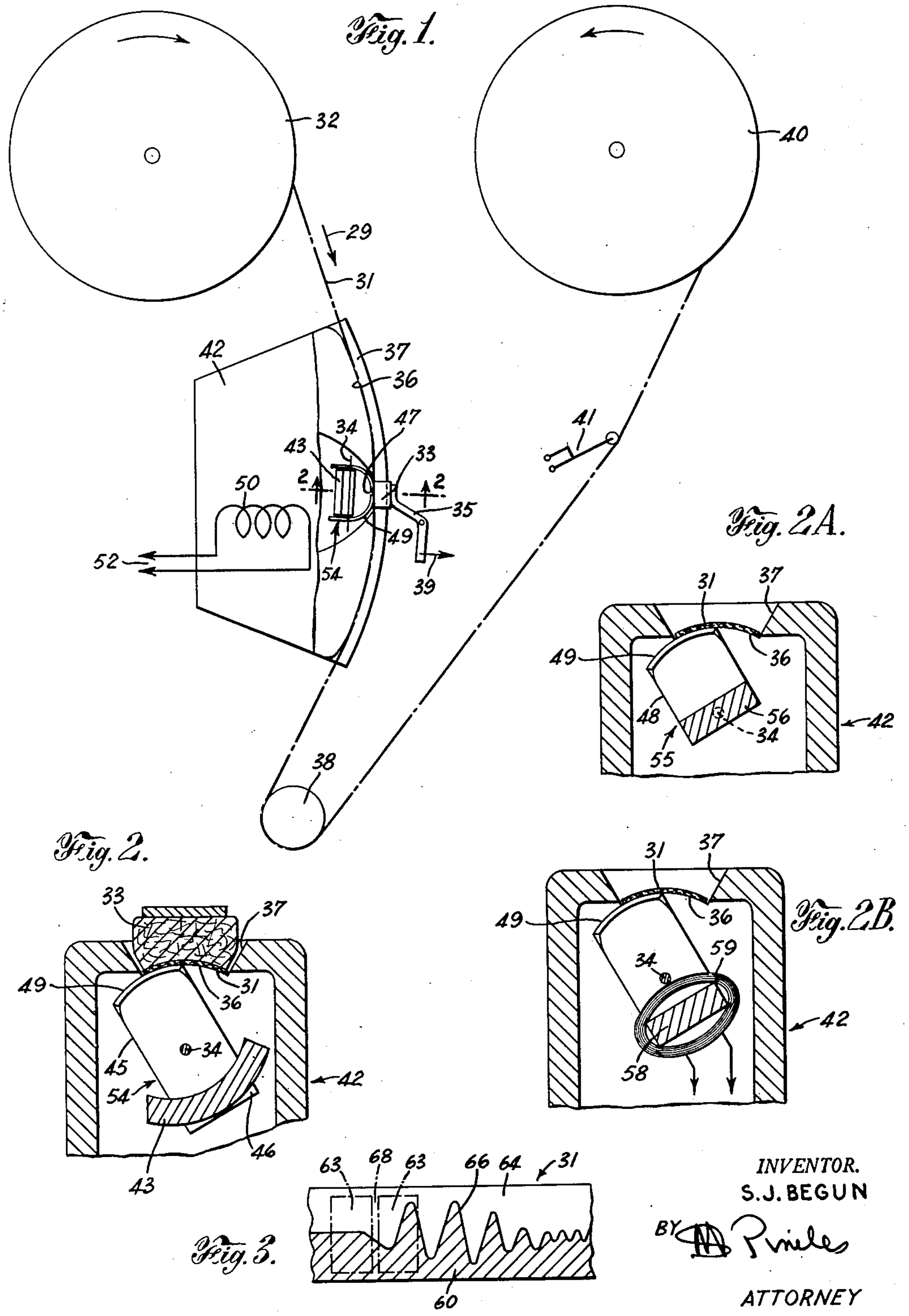
Fig. 1 is a diagrammatic top view of a novel form of magnetic recorder in accordance with the invention.
Fig. 2 is a sectional view taken along the line 2—2 of the apparatus shown in Fig. 1.
Figures 2C, 4:
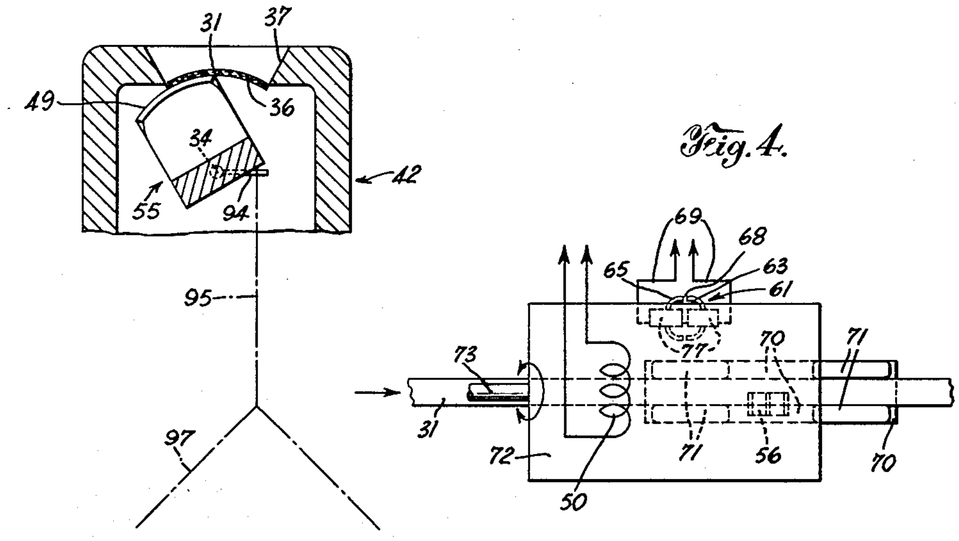
Figure 5:
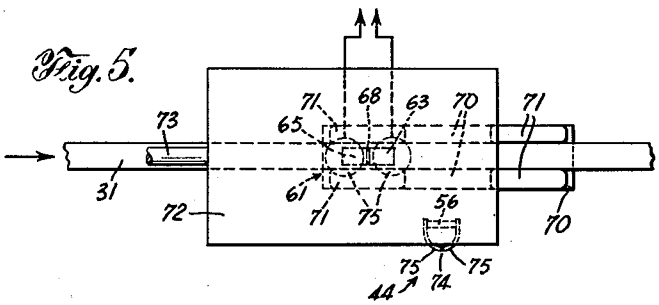

Figs. 2-A, 2-B and 2-C are detail views similar to Fig. 2 of modified forms of the record transducer of Fig. 1;

Fig. 3 is a curve diagram which indicates the transducing action of the apparatus of Fig. 1;

Figs. 4 and 5 are top views of a different magnetic transducer embodying the invention in record and playback positions, respectively.

Figure 7:
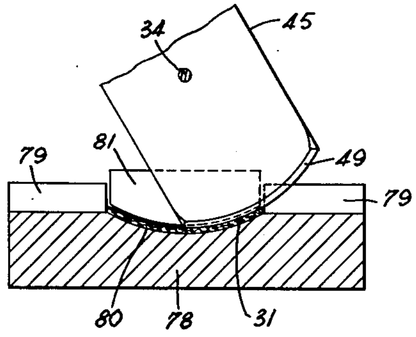
Figure 6:
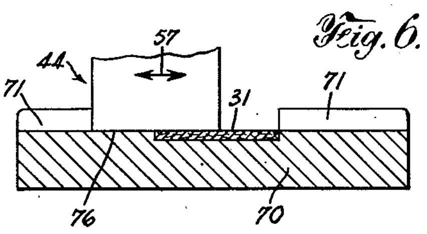
Figure 8:
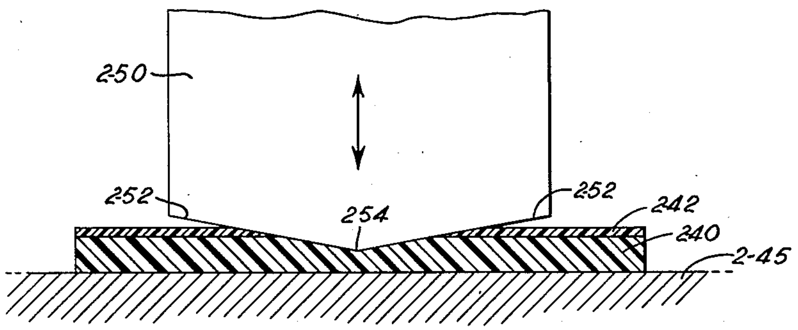
Figure 9:
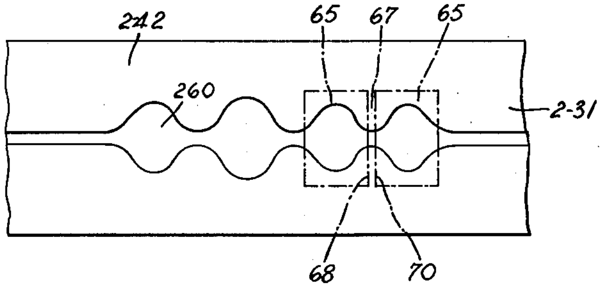
Figure 10:
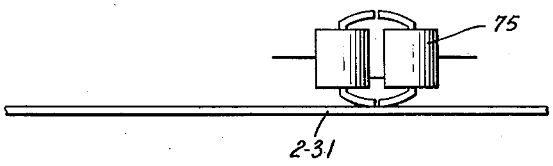

Fig. 6 is a detail view of the apparatus of Fig. 4 taken along line 6—6;

Fig. 7 shows a modified construction of the transducing apparatus shown in Fig. 6;

Fig. 8 is a sectional view of a further form of magnetic recording apparatus exemplifying the invention;

Figs. 9 and 10 are top and side views respectively, showing the operation of the construction of Fig. 8 during playback.

Figs. 1 and 2 diagrammatically show the general relationships and essential features of a magnetic recording apparatus based on some of the principles of the invention. A relatively wide record track 31 moving in the direction indicated by the arrow 29 is shown as unwinding from a supply reel 32, moving over magnetic transducer head 42, then over a capstan roller 38 to be wound on a take-up reel 40. The guide head 42 has a record track guide surface indicated at 36 which acts as a backing for the record track and is shown as provided with upwardly extending wall portions 37 for holding the record track in proper operative relation to a magnetic core 54 shown supported in the head 42 interiorly of the guide surface. A limit switch 41 may be provided to automatically terminate the record track drive when the reeling is completed.

As more clearly shown in Fig. 2, the guide surface 36 is transversely convex in shape adjacent the magnetic core 54 so as to hold the record track 31 in arcuate relationship as it moves over the core 54. The core 54 shown in enlarged section in Fig. 2 has an elongated magnet leg 43 and a pair of core arms 45 of high permeability material extending outwardly from the ends of the magnet 43 toward the guide surface 36 where they are bent toward each other and spaced by a diminutive non-magnetic gap 47. The guide surface 36 is slotted adjacent the region of the gap 47 so that a record track held against the guide 36 will be brought into close magnetic linkage with the outer faces 49 of the core arms 45.

The magnet leg 43 is shown in Fig. 2 as curved transversely and is held in place in the head 42. The arms 45 are pivotally mounted to oscillate around the axis 34 with the separated ends of the arms having flat inner faces 46 moving across and magnetically linked with the opposing ends 43. Adjacent the non-magnetic gap 47, the two arms 45 are convexly bent outwardly so that the pole faces 49 form arcuate portions of a circle having the axis 34 as its center.

The arrangement of guide surface 36, pole faces 49 and oscillating axis 34 is such that the record track 31 held against the guide surface will have varying portions of its width magnetically linked with the core 54 with varying positions of the arms 45 on the axis. At the same time, the magnet 43 is so disposed with respect to the arms 45 that a substantially constant magnetic flux is induced through the arms 45 and the gap 47 in spite of such oscillation of the arms 45.

The transducing head 42 is also shown as containing the transducing means, such as the coil 50, having feed connections 52 through which signals desired to be recorded on the record track 31 are supplied to the head in the form of electrical currents. The transducing coil 50 cooperates with the pivotally mounted core arms 45 by a linkage not shown so that variations in the currents fed to the coil produce oscillating movements of the arms around the pivot axis 34. Conventional linkages may be used for obtaining faithful response of the core arm oscillation to the coil currents. Where the signals to be magnetically recorded are of the general speech and music class, for example, the linkages may be of the type used in cutting lateral phonograph records with suitable adjustment of leverages to effect the desired amplitude of magnet arm displacement. Typical linkages of this type are shown in the following U. S. Patents: 2,161,489; 2,149,216; 2,072,610; 2,037,255; 2,027,169; 1,871,259; 1,792,497. Conventional arrangements for swinging the light gate of photoelectric recorders may also be used.

The transverse curvature of the guide floor 36 need not extend into the longitudinally curved outer regions and may be arranged to smoothly taper off. A pressing pad 33 is shown as held on a pad arm 35 and pivoted under the control of linkage 39 to bring the pad into pressing engagement with the record track 31 adjacent the core and hold the record track in firm and stable magnetic linkage with the pole faces 49.

As shown in Fig. 2 where the core 54 is illustrated in its equilibrium or no-signal position, the record track is so positioned relative to the magnet member that only about half the record track width is engaged by the pole faces. This is arranged by suitably biasing the core arms so that in the absence of signal they automatically assume this position.

The head is arranged so that the arms are actuated by signal currents in coil 50, to move laterally to positions in which they are magnetically linked with more or less of the record track width, thereby making a variable area recording. It is preferred that the lateral movements be limited so that the maximum signal to be recorded does not swing the recording magnet member far enough to make it either cover or uncover the entire record track width.

To effect a recording operation according to one phase of the invention, the record track is threaded into the position shown in Fig. 1 and the capstan is actuated to drive the record track across the head at the desired recording speed. The coil 50 may be fed electric currents corresponding to a signal to be recorded, such as an amplified output of a microphone or other signal source. The permanently magnetizable record track 31 may be demagnetized before it reaches the magnetic core 54 so that the flux leaking from the gap 47 imparts to the record track a magnetic flux distribution substantially constant with respect to the portions of the track momentarily magnetically linked but varying transversely across the width of the track in accordance with the movement of the core arms 45 under the influence of the signal currents fed to the coil 50.

Fig. 3 illustrates the magnetic flux distribution along the record track 31 resulting from such a recording operation. The shaded portions 60 indicate regions having a permanent magnetic flux of substantially unvarying density, the surrounding record track areas 64 exhibiting substantially no flux when the recording is preceded by demagnetization. The flux distribution pattern of Fig. 3 is that produced from an original signal having variations or signal waves corresponding to the curved line or envelope 66 separating the areas 60 and 64.

The width of the record track 31 may be a little wider than the maximum amplitude of pole face oscillation. This arrangement leaves margins along both lateral edges of the record track which may be avoided during signal reproduction so that their magnetic characteristics are not utilized. This is of advantage in minimizing the noise level produced by unavoidable magnetic non-uniformities along these margins, as where the record track is of the type containing a bonded magnetizable powder stratum, as shown in the Kornei application Serial No. 635,092, now abandoned.

Instead of having the record track 31 demagnetized before it reaches the recording core 54, the record track may be preliminarily magnetically saturated, in which case the flux induced by the saturation may be directed oppositely to the flux induced by the recording magnet unit 54.

Such preliminary saturation may be effected by merely mounting a permanent magnet in the path of the record track 31 so that it is magnetically linked with that portion of the record track in which the recording is to be made. Such preliminary saturation not only obliterates any prior recorded signal but also has the effect of increasing the signal response in the pick-up head, inasmuch as the oppositely directed flux in area 64 causes in a pick-up core a flux change which adds to and reinforces any flux change produced by the signal variations of area 60. For example any narrowing of the area 60 with resulting decrease in the flux induced by recording magnet 54 is accompanied by simultaneous increase in the opposite flux of area 64 and the increase in oppositely directed flux has the same magnetic effect as the decrease in recording magnet flux. If the magnet 54 is strong enough to effect saturation along the shaded area 60, the preliminary saturation of the area 64 in the opposite direction will approximately double the amplitude of the playback, but if the recording core 54 does not establish enough flux to induce saturation, the playback amplitude will be more than doubled.

The preliminary polarization need not be such that the flux thereby induced in the record track is directed longitudinally along the track but may be arranged to have its flux directed at an angle to the longitudinal direction so long as it provides a component in the desired direction. Furthermore, the preliminary polarization, if not needed for obliteration, need not be intense enough for saturation.

The recording apparatus shown in Figs. 1 and 2 may also be used for preparing variable width magnetic recordings along narrow track portions of a wide record member. For example, a plurality of adjacent record track channels may be established along tangibly indistinguishable portions of a continuous record member. With such arrangements, small unused margins may be provided in order to insure separation of individual channels.

Recordings of the type prepared above may be reproduced with conventional magnetic transducers in which the record track 31 may be moved across and in magnetic linkage with a magnetic playback core and pole faces 66 spaced by a non-magnetic gap 68 as shown in Fig. 3. The general arrangements of such a playback is shown in the above mentioned Kornei applications, as well as in the copending Dank application, Serial No. 690,878, filed August 16, 1946, now Patent No. 2,535,486, issued on December 26, 1950. The passage of successive elemental portions of the record track across the gap 68 induces a varying magnetic flux in the playback core in accordance with the signal variations recorded and the varying magnetic flux may be transduced into electrical voltages, amplified and reproduced in a loudspeaker, for example.

Fig. 2–A is a sectional view similar to that shown in Fig. 2 of a modified form of a variable width magnetic recording head. In this construction, the recording core 55 is shown as an integral assembly of a magnetic leg 56 to the ends of which a pair of high permeability arms 48 are fixed, the arms defining pole faces 48 in the manner described in connection with Figs. 1 and 2. The core 55 is pivotally mounted in the recording head on axis 34, which may be located so as to pass through the magnet 56, thereby minimizing the rotational inertia of the core. The magnet leg 56 may be quite thick, as shown, to provide the desired flux through the relatively thin core arms 48 so that most of the core mass is in the magnet 56. The construction of Fig. 2–A may otherwise be similar to that shown above for the construction of Figs. 1 and 2.

Fig. 2–B shows a further modification of a recording head according to the invention. In this construction, the permanent magnet leg 43 of Figs. 1 and 2, or the permanent magnet leg 56 of Fig. 2–A is replaced by a core leg 58 of low coercive force, such as Mumetal, windings 59 linked with the core leg 58 being arranged to supply the magnetic flux used in the recording operation. The recording head may otherwise be similar to those shown above and operates in substantially the same manner.

The recording core windings 59 of Fig. 2–B may be supplied with D. C. current to produce uniform record track polarization in the manner indicated above in connection with Fig. 3. Alternatively, the windings 59 may be supplied with signal currents for producing a record in which both the transverse distribution as well as the density of recorded signal flux are simultaneously varied. The signal current supplied to core windings 59, according to this phase of the invention, may have a conventional D. C. or high high frequency A. C. bias superimposed for improving the fidelity of the recording as is well known in the art. Where the record member is demagnetized before recording the A. C. bias method may be used, and where the record member is magnetically saturated before recording, as indicated above, the D. C. type of bias may be employed. The biased currents supplied to the core windings 59 need not be fed to the transducing coil 50 inasmuch as the oscillation of the recording cores about their axis 34 may be arranged for faithfully following the signal variations without such bias.

On the other hand, where the recording is to be made on the adjacent record channels, the pole faces 49 may be made of a width corresponding to the width of the individual record channel, and the equilibrium or no signal rest position of the core may be shifted by the application of bias supplied to the transducing coil 50. According to this modification, the maximum amplitude of core oscillation should be limited to the width of a single record channel and the bias supplied to the transducing coil 50 should be sufficient to shift the rest position of the core to different channels. The feeding of bias currents through the transducing coil 50 for the purpose of recording with narrow cores may be employed with the recorder constructions of the type shown in Figs. 1, 2, 2–A or 2–B for the purpose of making the recording on adjacent narrow record channels of the record member 31.

In the form of the invention shown in Fig. 2–B wherein a constant bias flux is supplied to the recording core, the core leg 58 may be arranged to provide enough permanent magnetization to supply this bias so that no D. C. need be passed through the windings 59.

As another modification the windings of the recording core may be supplied with currents having a frequency high enough to cause demagnetization of the magnetically linked portions of the record track. With this arrangement a magnetically polarized record track may have a signal recorded by having varying transverse portions demagnetized so that as shown in Fig. 3 the shaded area 60, which represents portions of the record track magnetically linked with the recording magnet, are magnetically neutral and the area 64 is polarized.

Other arrangements may be employed to cause the recording magnet to oscillate under the influence of the signals to be recorded in accordance with the invention. Fig. 2–C, for example, illustrates another construction in which the recording core 55, of the type shown in Fig. 2–A, is mounted on a pivot 34 and mechanically connected by links 94 and 95 to the apex of a conical diaphragm 97, the periphery of which is fixed. The diaphragm will pick up compressional vibration signals, such as sounds, and will directly oscillate the recording core, in accordance with such signals, to effect the desired recording. Vibrations or movements in any medium, whether liquid, gaseous or solid, may be directly linked to the oscillating magnet in a similar manner.

Figs. 4, 5 and 6 show a further form of the invention in which a recording core 44 is held on a magnetic transducing head 72 so that the core is transversely slidable to and fro across a magnetic record member 31 as shown by the double-ended arrow 57 in Fig. 6. The record track 31 is shown as guided over a support 70 having upstanding side guides 71, and against which the transducing head 72 may be biased as by its own weight. The core 44 may have a permanent magnet leg 56 and a pair of curved high permeability arms 75 having pole faces 76 separated by a non-magnetic gap 74, and the core may be arranged to oscillate in response to the signal currents passed through a transducing coil 50 also contained in the head 72 and linked with the core as by the conventional linking means indicated above. The core 44 may be similar to the cores of Figs. 2, 2–A and 2–B, except that the pole faces 76 of core 44 may be generally flattened for proper engagement with the flattened condition of record track 31 in the construction of Figs. 4, 5 and 6.

The head 72 is shown as held on an arm 73 and may be rotated around the arm as an axis for the purpose of removing the recording core 44 from engagement with the record track when desired.

The biasing forces holding the recording core 44 in contact with the record track may be directly absorbed by the recording core, or if desired one or more spacing supports may be provided on the lower face of transducing head 72 for engagement with the record track support 70 to thereby hold the pole faces 76 in stable, firm, magnetic linkage with the record track while at the same time relieving the core from excess strain.

Flexing of the thin core arms of the recording cores of Figs. 1 through 6 may have a tendency to adversely affect their permeability, and may be guarded against by mounting a stiffening insert, such as a light but rigid plastic backing, within the cores for firmly holding the pole face portions of the core arms. In the unitary core constructions of Figs. 2–A, 2–B, 2–C and Figs. 4, 5 and 6 the pole face support may fill the space within the core and may provide a light, rigid form around which the elements of the core are held.

In the transducing head construction shown in Figs. 4 and 5, there is also provided a second magnetic transducing core 60 mounted in one of the other faces of the head and disposed so that when the head is rotated around arm 73, either of the transducing cores 44 or 60 may be brought into magnetic linking engagement with the record track 31.

The transducing core 60 which is only diagrammatically illustrated may be of conventional construction, as shown for example in the above-mentioned Kornei applications, or the Begun application, Serial No. 688,738, filed August 6, 1946, now Patent No. 2,513,617, issued on July 4, 1950, and has magnetic pole pieces 65 around which are linked transducer windings 77. The pole pieces 65 have outwardly directed exposed pole faces 66 separated by a narrow non-magnetic gap 66 and bridged by elemental portions of the record track which engage the pole faces when the head is rotated to the position shown in Fig. 5. Leads 69 are provided for the windings 65 to be connected to suitable amplifiers, as shown for example in the above-mentioned Begun patent.

In the form of the invention shown in Fig. 2–B, the core windings 59 may be arranged not only to supply signal flux to the core, but may also be used to supply playback voltages to a playback amplifier and sound reproducer. The movable core may be arranged to have its position fixed so that the pole faces engage the entire width of the transducing channel of the record member so that the core acts as a playback core and the voltages generated in the windings 59 faithfully reproduce the signal flux variation of the individual record channels. This form of transducing core may be substituted for the corresponding core shown in Figs. 4 and 5, and the second transducing core 60 may be eliminated, and a head with a single core may be used for either recording or reproducing.

Fig. 7 shows a still further modification of the invention in which a record member 31 is held in a concave groove 80 of a record track guide 78. Side guides 79 may be provided on both sides of the groove 80 to properly direct the record member along the groove in a manner similar to that indicated in Figs. 4, 5 and 6. Retractable record member retainers 81 provided with convex lower faces may be arranged to hold the record member 31 in suitable convex disposition against the guide groove 80. Pole faces 49 of core arms 45 similar to those shown in Figs. 2, 2–A and 2–B, for example, may be arranged to oscillate around an axis 34 to prepare variable width recordings in a similar manner. The retractable retainers 81 may be mounted on the head in which the core arms 45 are pivotally held so that after the record member 31 is placed in the groove 80 the transducing head may be brought into engagement therewith, and the record track 31 may be suitably impelled along the guide at the desired speed to make the variable width recording.

In the constructions of Figs. 1 through 7, the tapered record track engaging faces of the transducing cores although held in firm magnetic engagement easily ride over a thickened portion of the record member, as for example, where the record is spliced.

The apparatuses and methods described above are highly useful in the recording and reproducing of low frequency signals, such as those arising from the exploration of strains in mechanical structures. Aircraft components or complete assemblies may be thus explored in flight, the strain indicating signals being recorded and reproduced with very high efficiencies.

According to the above forms of the invention the magnetic polarization of the record track by the recording magnet unit, is longitudinally directed with respect to the record track and has all the advantageous features of the longitudinal magnetic recording technique as contrasted with the transverse and perpendicular recordings which are much poorer in fidelity and signal-to-noise ratio. Furthermore, this longitudinal recording is produced with a relatively small recording unit which easily and faithfully follows the signal variations. As an added feature the recording of this form of the invention can be arranged to substantially saturate the polarized regions of the record track as represented by the shaded area 60 so that playback signal levels are relatively high. No separate high frequency current generator is required to provide the A. C. recording current bias used in prior recording techniques.

As another feature of the invention, the recording operation may be effected by a pen held against a longitudinally moving record member and applying a varying magnetizable stratum to it while the pen is subjected to transverse oscillation in accordance with the signal to be recorded. Such a recording arrangement is provided by merely substituting a wide pen and inking arrangement for the magnet 54. The ink may have a magnetizable pigment, such as a finely divided magnetic iron oxide ($Fe_3O_4$ or gamma-$Fe_2O_3$) or powdered magnetic metals, as for example the highly magnetic iron alloys of aluminum, nickel and cobalt known as "Alnico," held in a suitable dispersant such as ordinarily used in fountain inks for example. The magnetic particles need not be magnetized before application to the record track and may very simply be magnetized by passing the inked record back through a suitable magnetic field which may be provided in the playback transducer.

The above method of making inked magnetic recordings exhibits the tremendous practical advantage of enabling rapid and inexpensive reproduction in large quantities by simple operations such as printing. Commercial recordings of this type can be produced and distributed at highly competitive prices.

According to a modified method, instead of depositing a permanently magnetizable coating on a base having less or no magnetizablity, the base may be permanently magnetizable; that is have a high remanence, and the transversely varying coating may be a magnetic composition having less or no remanence. In such modification the coating acts as a magnetic shunt which shields the coated portions of the permanently magnetizable stratum and greatly diminish its induction in a magnetic transducing core. The low remanent coating may include a finely divided material such as powdered iron or powdered specially prepared alloys such as silicon steel or the iron alloy containing about 76% nickel, 6% copper and 15% chromium available under the trade name "Mumetal." The metal may be incorporated in the ink directly or the ink may merely furnish an adherent binder to which the finely divided metal may be secured as by applying the metal powder to the record track and blowing, shaking or scraping away the non-adhering portion. The latter method of application is also suitable for the magnetic coatings described above.

According to another phase of the invention transversely varying recordings are made by removing magnetic material from a magnetic surface. Figs. 8 and 9 diagrammatically indicate one example of such an arrangement which is similar to the system for making hill-and-dale phonograph recordings.

As shown, an elongated record track 2-31 including a backing member 2-40 provided with a magnetizable coating layer 2-42 is moved longitudinally over a support 2-45 so that the magnetic layer 2-42 contacts the cutting faces of the cutting stylus or tool 2-50. The cutting faces 2-52 are shown as defined by the lower end of the stylus 2-50 and as generally V-shaped, with the apex of the V 2-54 pointed downwardly and defining an apical angle of slightly less than 180°.

The cutting stylus 2-50 is mounted on suitable means for vibrating it perpendicularly to the record track in accordance with the signal to be recorded and as indicated by the double-ended arrow in Fig. 8. Movement of the support 2-45 with its magnetic stratum between the stylus and the backing 2-40 causes the cutting faces 2-52 to cut or gouge out more or less of the magnetic stratum along the line of contact as determined by the vibrating position of the stylus. The magnetic stratum 2-42 should be made quite thin, of the order of one mil, so as to keep the margins of the cutout portions from tapering off too gradually.

As shown in Figs. 9 and 10, the gouged or cut out portions 2-60 of the magnetic stratum 2-42 form a pattern corresponding to the recorded signal, and if the pattern is moved longitudinally so that consecutive elemental portions are linked with a magnetic core, such as the core 61 of Fig. 3 and indicated by the pole pieces 65 having a non-magnetic transverse gap 67 bounded by pole faces 68 and 70, there will be induced in the magnetic core a variable flux corresponding to the variable width of magnetic stratum remaining on the support 2-40. These flux variations may then be transduced as by converting them to electrical current variations in the windings 75 linked with the magnetic core and passing these electrical variations through conventional amplifying apparatus and feeding to a reproducing device such as a loudspeaker.

The specific details of the cutting stylus arrangement are well known and are not shown, any conventional construction being suitable. The Miller Patent 1,919,116 and the De Boer et al. Patent 2,194,642 disclose several satisfactory constructions.

As indicated above the magnetic stratum 2-42 need only be magnetized at the time the signal is played back.

A feature of the grooved recordings of Figs.

8 and 9 is that they may be played back with a transducing head guided along the grooved track by a guide pin engaging in and following the groove in a manner similar to the conventional phonograph needle. In one form, such transducer may be mounted on a conventional phonograph pick-up arm and have pole pieces arranged to be magnetically linked with the groove near the guide needle. Additionally, the phonograph pick-up may be used to play back the recording together with the magnetic pick-up, the recorded signal being the same whether recorded physically by the shape of the groove or magnetically by the magnetic flux variation associated with the shape of the groove. According to the invention, a single recording, such as the conventional hill-and-dale recordings made on a magnetic member as explained above in connection with Figs. 8 and 9 may be played back on either a magnetic transducer or a phonograph-type transducer. A phonograph-type plastic disc record member containing a filler of powdered permanently magnetizable material, such as magnetic iron oxide, and having a grooved recording cut in a surface is one example of such a recording that can be played back with equal ease from either type of transducer.

The magnetic transducing head may, if desired, be guided along the record grooves by a separate guide means such as the feed screw arrangement generally used in cutting the phonograph recordings. Alternatively, a separate spirally grooved guide disc coacting with a projecting pin portion of the head, as shown in the Williams application Serial No. 753,159 filed June 7, 1947, may also be used.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a magnetic record transducing apparatus: an elongated permanently magnetizable wide record track; means for driving said record track; a magnetic transducing head comprising a magnetic core which includes a pair of pole tips of given width spaced by a non-magnetic gap; means movably mounting said head with a portion only of the width dimension of said pole tips in magnetic linkage with a portion only of the width dimension of said record track; and means for moving said head sideways with respect to said record track as said record track is driven past said head to vary the area of magnetic linkage between said head and said track.

2. A magnetic record transducing apparatus as set forth in claim 1; further characterized by said pole tips in the area of said non-magnetic gap being curved about said mounting means as a center and further characterized by said record member being curved about said curved pole tip area.

3. A magnetic record transducing apparatus as set forth in claim 2, further characterized by said mounting means comprising pivot means about which said head swings, and said means for moving said head comprises means for swinging said head about said pivot means.

4. In a magnetic recording apparatus: an elongated permanently magnetizable wide record track; means for driving said track; a magnetic recording head comprising core means having a recording tip of given width; means mounting said head with a portion only of the width dimension of said recording tip in magnetic linkage with a portion only of the width dimension of said record track; and means for effecting relative motion between said recording tip and said record track in a direction transverse to the direction in which said record track is driven to vary the area of magnetic linkage between said recording tip and said track as said track is driven past said recording tip.

SEMI JOSEPH BEGUN.

REFERENCES CITED

The following references are of record in the file of this patent:

UNITED STATES PATENTS

| Number | Name | Date |
|---|---|---|
| 460,338 | Heysinger | Sept. 29, 1891 |
| 488,191 | Edison | Dec. 20, 1892 |
| 831,779 | Emerson | Sept. 25, 1906 |
| 873,084 | Poulsen | Dec. 10, 1907 |
| 882,329 | Lieb | Mar. 17, 1908 |
| 893,277 | Stuart | July 14, 1908 |
| 1,152,562 | Sherman | Sept. 7, 1915 |
| 1,156,976 | Clement | Oct. 19, 1915 |
| 1,815,010 | Pollock | July 14, 1931 |
| 1,847,860 | Best | Mar. 1, 1932 |
| 1,859,930 | Miller | May 24, 1932 |
| 1,886,616 | Alverson | Nov. 8, 1932 |
| 1,940,274 | Severy | Dec. 19, 1933 |
| 1,941,036 | Lenk | Dec. 26, 1933 |
| 2,109,627 | Finch | Mar. 1, 1938 |
| 2,213,631 | Heller | Sept. 3, 1940 |
| 2,361,753 | Eilenberger | Oct. 31, 1944 |

FOREIGN PATENTS

| Number | Country | Date |
|---|---|---|
| 371,329 | Great Britain | Oct. 17, 1930 |
| 621,263 | Germany | Nov. 4, 1935 |
| 703.916 | France | May 8, 1931 |